United States Patent Office 3,211,789
Patented Oct. 12, 1965

3,211,789
ARALKYLAMINOALKYLENE GUANIDINES
Nils S. Hjelte, Svartbacksgatan 101A,
Uppsala, Sweden
No Drawing. Filed Dec. 27, 1962, Ser. No. 247,553
Claims priority, application Sweden, Aug. 23, 1962,
9,136/62
19 Claims. (Cl. 260—564)

INTRODUCTION

The present invention generally relates to novel guanidine derivatives and acid-addition salts thereof. More particularly, the invention pertains to N-(guanidinoalkyl)-N-alkyl-phenyl-alkylamines and substitution products of these compounds carrying one or more substituents in the phenyl radical as well as acid-addition salts thereof.

THE NOVEL GUANIDINE DERIVATIVES BROADLY

The novel guanidine compounds of this invention can be represented by the formula:

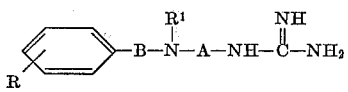

wherein:
R represents at least one member selected from the group consisting of hydrogen, halogen, lower alkyl, and lower alkoxy, $R^1$ is a lower alkyl, containing from 1 to 4, inclusive, carbon atoms, B is a lower alkylene, containing from 2 to 5, inclusive, carbon atoms, and A is a lower alkylene, containing from 1 to 5, inclusive, carbon atoms, and non-toxic acid-addition salts thereof. The number of possible substituents in the phenyl radical is arbitrary. The substituent, if any, is usually in the para-position of the phenyl radical, but may also be present in the ortho-position.

As examples of the substituents R, $R^1$, A and B in the above formula there may be mentioned:

R: hydrogen, chloro, bromo, methyl, ethyl, propyl, isopropyl, n-butyl, isobutyl, sec.butyl, tert.butyl, methoxy, ethoxy, n-propoxy, isopropoxy, n-butoxy, sec.butoxy, isobutoxy, $R^1$: methyl, ethyl, propyl, isopropyl, n-butyl, isobutyl, sec.butyl, tert.butyl, B: 1,2-ethylene, 1,3-propylene, 1-methyl-1,2-ethylene, 2-methyl-1,2-ethylene, 1,4-butylene, 1,1-dimethyl-1,2-ethylene, 2-methyl-1,3-propylene, 1-methyl-1,3-propylene, 3-methyl-1,3-propylene, 1,5-pentylene, 1-methyl-1,4-butylene, A: 1,2-ethylene, 1,3-propylene, 1-methyl-1,2-ethylene, 2-methyl-1,2-ethylene, 1,4-butylene, 2-methyl-1,3-propylene, 1,5-pentylene, 1-methyl-1,4-butylene, 4-methyl-1,4-butylene.

Specific compounds encompassed by the above formula are set forth in the following examples and claims.

FREE BASES OR ACID-ADDITION SALTS OF THE NOVEL GUANIDINE DERIVATIVES

Depending on the conditions used, the novel guanidine derivatives of this invention can be obtained in the form of their free bases or their salts. The salts can be converted, in a known manner, to their corresponding free bases, for example by reacting them with a basic substance, such as an alkali metal hydroxide or an alkali metal carbonate. The free base can be converted into its acid-addition salts, for example by reacting it with an inorganic or organic acid according to procedures well known to the art (see for example U.S.P. 2,928,829, column 3, line 33 to column 4, line 10). A solvent can be present during the salt forming operation. Ion exchangers may also be utilized to effect the above conversions.

UTILITY OF THE NOVEL GUANIDINE DERIVATIVES

The above-mentioned novel guanidine derivatives and their salts, especially the mono-acid-addition salts, exhibit a rapidly beginning blocking effect on the sympathetic nervous system of long duration without any essential effect on the parasympathetic nervous system. They are, therefore, especially valuable blood-pressure lowering agents.

The novel compounds of this invention can be administered as such or in the form of their salts, if desired, after compounding them with pharmaceutically usable adjuvants and carriers, parenterally or orally. For the oral administration may be mentioned tablets and dragées into which the compounds are converted by mixing them with the usual carriers, such as milk, sugar, starch, tragacanth and magnesium stearate. Any well known medicament compounding or administering procedure can be used (e.g. see U.S.P. 2,928,829, column 4, line 60 to column 5, line 4).

GENERAL PREPARATION OF THE NOVEL GUANIDINE DERIVATIVES

The novel guanidine derivatives are prepared by treating a first reactant, comprising an amine of the formula:

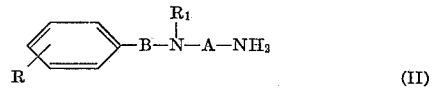

in which R, $R^1$, A and B each have the above-mentioned significance, with a second reactant capable of forming, with the primary amino-group of the first reactant by condensation or addition, the guanidino group and then converting, if desired, the resulting reaction product into its acid-addition salts with inorganic or organic acids.

EXAMPLES IN GENERAL

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the degrees are in centigrade, the temperature is room temperature and the pressure is atmospheric, unless otherwise indicated.

*Example 1.—N - (2 - guanidinoethyl) - N - methyl - 3-phenylpropylamine*

(A) *N - methyl - N - cyanomethyl - 3 - phenylpropyl amine.*—In a flask are placed a mixture of 19.6 g. (0.26 mole) of chloroacetonitrile and 17.9 g. (0.13 mole) of sodium carbonate in 200 ml. of benzene and to the mixture is added, dropwise, a solution of 39 g. of N-methyl-3-phenylpropylamine in 90 ml. of benzene. The mixture is heated with reflux for 10 hours. After filtration, the solvent is driven off from the filtrate and the residue is distilled under vacuum collecting a fraction having the B.P. 118–120° at 1.0 mm. of Hg, $n_D^{20°}=1.5132$. The yield of N-methyl-N-cyanomethyl-3-phenylpropylamine is 28.5 g. (58 percent).

(B) *N - methyl - N - (2 - aminoethyl) - 3 - phenylpropylamine.*—A solution of 28.5 g. (0.15 mole) of N-methyl-N-cyanomethyl-3-phenylpropylamine in 50 ml. of dry ether is added dropwise to 8.7 g. (0.23 mole) of lithiumaluminiumhydride, dispersed in 400 ml. of dry ether. The mixture is refluxed for 4 hours. After hydrolyzing and filtration of the aluminate formed thereby, and evaporation of the solvent from the filtrate, the residue is distilled while collecting a fraction having the B.P. 139–144° C. at 8 mm. of Hg, $n_D^{20°}=1.5158$. The yield of N-methyl-N-(2-amino-ethyl) - 3 - phenylpropylamine is 14 g. (48.5%).

(C) *N - (2 - guanidinoethyl) - N - methyl - 3 - phenylpropylamine.*—In a flask are placed 5.4 g. (0.028 mole) of N-methyl-N-(2-aminoethyl)-3-phenylpropylamine and 3.9 g. (0.014 mole) of S-methyl-thiocarbamidesulfate, dissolved in 25 ml. of water, and the solution is refluxed for 5½ hours. On cooling, crystallization will take place, and crystallizate is then recrystallized from ethyl alcohol. The yield of bis-[N-(2-guanidinoethyl)-N-methyl - 3 - phenylpropylamine]-sulfate is 6.5 g. (82%); melting point 163–164° C.

Analysis:

|  | C | H | N | S |
| --- | --- | --- | --- | --- |
| Calculated | 55.06 | 8.18 | 19.77 | 5.66 |
| Found | 55.46; 55.59 | 8.37 | 20.04; 20.16 | 5.45; 5.34 |

*Example 2.—N - (2 - guanidinoethyl) - N - methyl - 2 - phenyl-1-methylethylamine*

(A) *N - cyanomethyl - N - methyl - 2 - phenyl - 1-methylethylamine.*—30 g. (0.2 mole) of N - methyl - 2-phenyl-1-methylethylamine, dissolved in 60 ml. of benzene, are added to a mixture of 15.1 g. (0.2 mole) of chloroacetonitrile in 100 ml. of benzene and 10.6 g. (0.1 mole) of sodium carbonate during about 30 min., and the mixture is refluxed for 4 hours. On cooling, all solids are filtered off and the filtrate is evaporated. The residue is distilled under vacuum. In this connection, a fraction having the B.P. 165° C. at 10 mm. of Hg, $n_D^{20°}=1.5179$, will be obtained. The yield of N-cyanomethyl-N-methyl-2-phenyl-1-methylethylamine will be 28 g. (81.5%).

(B) *N - (2 - aminoethyl) - N - methyl - 2 - phenyl - 1-methylethylamine.*—28 g. of N-cyanomethyl-N-methyl-2-phenyl-1-methylethylamine (0.159 mole) are dissolved in 100 ml. of dry ether and the solution is added, in a dropwise manner, to 9.5 g. (0.25 mole) of lithiumaluminiumhydride, dispersed in 400 ml. of dry ether. The mixture is refluxed for 5 hours. After hydrolyzing, filtering the aluminate formed as a result hereof, drying the filtrate and evaporating the latter, the residue is distilled under vacuum while collecting a fraction having the B.P. 125–135° C. at 10 mm. of Hg. The yield of N-(2-aminoethyl)-N-methyl-2-phenyl-1-methylethylamine will be 19 g. (62%).

(C) *N - (2 - guanidinoethyl) - N - methyl - 2 - phenyl-1-methylethylamine.*—19 g. (0.105 mole) of N-(2-aminoethyl)-N-methyl-2-phenyl-1-methylethylamine and 13.9 g. (0.053 mole) of S-methyl-carbamide-sulfate are dissolved in 200 ml. of water and the solution is refluxed for 4 hours. On cooling, crystallization will take place. The crystallizate is recrystallized from ethyl alcohol. The yield of bis-[N-(2-guanidinoethyl)-N-methyl-2-phenyl-1-methylethylamine]-sulfate is 22 g. (74 percent); melting point 176–178° C.

Analysis:

|  | C | H | N | S |
| --- | --- | --- | --- | --- |
| Calculated | 55.10 | 8.18 | 19.77 | 5.66 |
| Found | 55.44 | 8.37 | 19.96; 19.92 | 5.56 |

*Example 3.—N-(2-guanidinoethyl)-N-methyl-2-phenylethylamine*

(A) *N-methyl - N-(cyanomethyl) - 2 - phenyl - ethylamine.*—55 g. (0.4 mole) of N-methyl-2-phenylethylamine are dissolved in 100 ml. of benzene and the solution is added, in a dropwise manner, to a mixture of 31 g. (0.4 mole) of chloroacetonitrile and 22 g. (0.2 mole) of sodium carbonate. The mixture is refluxed for 4 hours. On cooling, the sodium carbonate is filtered off and the filtrate is evaporated, whereupon the residue is distilled under vacuum to collect a fraction having the B.P. 105–125° C. at 0.3 mm. of Hg, $n_D^{20°}=1.5186$. The yield of N-methyl-N-cyanomethyl-2-phenylethylamine will be 60 g. (86%).

(B) *N - methyl - N - (2 - aminoethyl)-2-phenylethylamine.*—30 g. (0.18 mole) of N-methyl-N-cyanomethyl-2-phenylethylamine are dissolved in 100 ml. of dry ether and the solution is added to 8.5 g. (0.23 mole) of lithiumaluminiumhydride, dispersed in 500 ml. of dry ether. The mixture is refluxed for 10 hours. After hydrolyzing and filtering off the aluminate, the filtrate is evaporated and the residue is distilled under vacuum to collect a fraction having the B.P. 129–132° C. at 10 mm. of Hg, $n_D^{20°}=1.5212$. The yield of N-methyl-N-(2-aminoethyl)-2-phenylethylamine is 28.0 g. (87.5%).

(C) *N-(2-guanidinoethyl)-N-methyl - 2 - phenylethylamine.*—28 g. (0.15 mole) of N-methyl-N-(2-aminoethyl)-2-phenylethylamine and 21.75 g. (0.075 mole) of S-methylthiocarbamidesulfate are dissolved in 130 ml. of water and the solution formed is refluxed for 4 hours. On cooling, crystallization will take place. The crystallized product is recrystallized from a mixture of alcohol and ether. The yield of bis-[N-(2-guanidino-ethyl)-N-methyl-2-phenylethylamine]-sulfate is 32.5 g. (81.5%) having the melting point 167–168° C.

Analysis:

|  | C | H | N | S |
| --- | --- | --- | --- | --- |
| Calculated | 53.91 | 7.92 | 20.21 | 6.00 |
| Found | 53.87; 53.81 | 7.80; 7.91 | 20.53; 20.49 | 5.92 |

*Example 4.—N-(2-guanidinoethyl)-N-ethyl-3-phenylpropylamine*

(A) *N - cyanomethyl-N-ethyl-3-phenylpropylamine.*—26 g. (0.16 mole) of N-ethyl-3-phenylpropylamine are added, in a dropwise manner, to a mixture of 8.5 g. (0.08 mole) of sodiumcarbonate and 12.3 g. (0.16 mole) of chloroacetonitrile in 200 ml. of absolute ethyl alcohol. The mixture is refluxed for 6½ hours and is then left to stand overnight at room temperature. The sodium chloride formed is separated off, the filtrate is evaporated, and the residue distilled under vacuum while collecting a fraction having the B.P. 165–168° C. at 10 mm. of Hg, $n_D^{20°}=1.5089$. The yield of N-cyanomethyl-N-ethyl-3-phenylpropylamine is 28 g. (87%).

(B) *N-(2-aminoethyl)-N-ethyl-3-phenylpropylamine.—* 28 g. (0.13 mole) of N-cyanomethyl-N-ethyl-3-phenylpropylamine are dissolved in 50 ml. of dry ether and the solution is added, in a dropwise manner, to 6.5 g. (0.17 mole) of lithiumaluminiumhydride in 500 ml. of ether. The mixture is refluxed for 10 hours. After hydrolyzing, the aluminate is separated off and the filtrate is evaporated, whereupon the residue is distilled under vacuum while collecting a fraction having the B.P. 175–178° C. at 10 mm. of Hg. The yield of N-(2-aminoethyl)-N-ethyl-3-phenylpropylamine is 24.1 g.

(C) *N-ethyl-N-(2-guanidinoethyl) - 3 - phenylpropylamine.*—24.1 g. (0.117 mole) of N-(2-aminoethyl)-N-ethyl-3-phenylpropylamine and 16.1 g. (0.0585 mole) of S-methylthiocarbamidesulfate are dissolved in 200 ml. of water and the solution is heated for 6½ hours with reflux. On cooling, crystallization will take place, and the crystals are then filtered off. They are recrystallized from a mixture of ethyl alcohol and water to yield 18 g. of bis-[N-ethyl-N-(2-guanidinoethyl) - 3 - phenylpropylamine]-sulfate having the melting point 73–75° C.

*Example 5.—N-(3-guanidinopropyl)-N-methyl-3-phenylpropylamine*

(A) *N-(2 - cyanoethyl) - N - methyl-3-phenylpropylamine.*—17 g. (0.115 mole) of N-methyl-3-phenylpropylamine are added, in a dropwise manner, to 6.1 g. (0.115 mole) of acrylnitrile at room temperature. The mixture is then heated on a water bath for 4 hours and left to stand over night. The product is distilled under vacuum to collect a fraction having the B.P. 175–177° C. at 10 mm., $n_D^{20°}=1.5132$. The yield of N-(2-cyanoethyl)-N-3-phenylpropylamine is 20 g. (86%).

(B) *N-(3-aminopropyl)-N-methyl - 3 - phenylpropylamine.*—20 g. (0.099 mole) of N-(2-cyanoethyl)-N-methyl-3-phenylpropylamine are dissolved in 50 ml. of dry ether and to the solution is added a dispersion of 4.95 g. (0.13 mole) of lithiumaluminiumhydride in 300 ml. of dry ether. The reaction mixture is refluxed for 6 hours and is then left to stand over night at room temperature. After hydrolyzing, the hydroxide is separated off and the filtrate is evaporated. The residue is distilled under vacuum while collecting a fraction having the B.P. 154–156° C. at 10 mm. of Hg, $n_D^{20°}=1.5140$. The yield of N-(3-aminopropyl)-N-methyl-3-phenylpropylamine is 11 g.

(C) *N-(3-guanidinopropyl)-N-methyl-3-phenylpropylamine.*—11 g. (0.0535 mole) of N-(3-amino-propyl)-N-methyl-3-phenylpropylamine and 7.4 g. (0.0268 mole) of S-methylthiocarbamidesulfate are dissolved in 75 ml. of water and the solution is refluxed for 6 hours. After cooling, the product is recrystallized from alcohol. The yield of bis-[N-(3-guanidino-propyl)-N-methyl-3-phenylpropylamine]-sulfate is 14 g.; melting point 109–114° C.

*Example 6.—N-(2-guanidinoethyl)-N-methyl-3-(p-methoxyphenyl)-propylamine*

(A) *N-cyanomethyl-N-methyl-3 - (p-methoxyphenyl)-propylamine.*—A mixture of 23.6 g. (0.315 mole) of chloroacetonitrile and 16.8 g. (0.158 mole) of sodium carbonate in 500 ml. of absolute alcohol is added, in a dropwise manner, to 56 g. (0.315 mole) of N-methyl-3-(p-methoxyphenyl)-propylamine. The reaction mixture is refluxed for 6 hours. After cooling, the sodium chloride formed is separated off. The filtrate is evaporated and the residue is distilled under vacuum while collecting a fraction having the B.P. 155–165° C. at 0.3 mm. of Hg. The yield of N-cyanomethyl-N-methyl-3-(p-methoxyphenyl)-propylamine is 59 g.

(B) *N-(2-aminoethyl)-N-methyl-3-(p-methoxyphenyl)-propylamine.*—To 59 g. (0.27 mole) of N-cyano-methyl-N-methyl-3-(p-methoxyphenol)-propylamine are added 12.5 g. (0.33 mole) of lithiumaluminiumhydride, dispersed in 1000 ml. of dry ether, in a dropwise manner. The reaction mixture is refluxed for 8½ hours to cause hydrolyzing to take place. The hydroxide is filtered off, the filtrate is evaporated, and the residue is distilled under vacuum to collect a fraction having the B.P. 108–111° C. at 10 mm. of Hg, $n_D^{20°}=1.5203$. The yield of N-(2-aminoethyl)-N-methyl - 3 - (p - methoxy-phenyl)-propylamine is 23.5 g.

(C) *N-(2-guanidinoethyl)-N-methyl-3-(p-methoxyphenyl)-propylamine.*—23.5 g. (0.111 mole) of N-(2-aminoethyl)-N-methyl-3-(p-methoxyphenyl)-propylamine and 15.2 g. (0.055 mole) of S-methylthiocarbamidesulfate are dissolved in 150 ml. of water and the mixture is heated for 8 hours. After cooling, the reaction product will crystallize. After recrystallization of the latter, there is obtained 6 g. of bis-[N-(2-guanidinoethyl)-N-methyl-3-(p-methoxyphenyl)-propylamine]-sulfate having the melting point 149–151° C.

*Example 7.—N-methyl-N-(2-guanidinoethyl)-3-(p-chlorophenyl)-propylamine*

(A) *N-cyanomethyl-N-methyl-3-(p-chlorophenyl)-propylamine.*—A mixture of 29.6 g. of chloroacetonitrile and 29.8 g. (0.196 mole) of sodium carbonate in 500 ml. of absolute ethyl alcohol is added dropwise to 42 g. (0.392 mole) of N-methyl-3-(p-chlorophenyl)-propylamine. The reaction mixture is refluxed for 7 hours. On cooling, the sodium chloride is separated off. The filtrate is evaporated and the residue is distilled under vacuum while collecting a fraction having the B.P. 153–157° C. at 0.2 mm. of Hg. The yield of N-cyanomethyl-N-methyl-3-(p-chlorophenyl)-propylamine is 81.5 g.

(B) *N-(2-aminoethyl)-N-methyl-3 - (p-chlorophenyl)-propylamine.*—To 81.5 g. (0.377 mole) of N-cyano-methyl-N-methyl-3-(p-chlorophenyl)-propylamine are added 23.0 g. (0.55 mole) of lithiumaluminiumhydride, dispersed in 1500 ml. of dry ether, dropwise. The reaction mixture is refluxed for 8½ hours, whereupon hydrolyzing is carried out. The hydroxide is filtered off, the filtrate is evaporated and the residue is distilled under vacuum while collecting a fraction having the B.P. 164–168° C. at 10 mm. of Hg, $n_D^{20°}=1.5288$. The yield of N-(2-aminoethyl)-N-methyl-3-(p-chlorophenyl)-propylamine is 45.5 g.

(C) *N-(2-guanidinoethyl)-N-methyl-3-(p-chlorophenyl)-propylamine.*—45.5 g. (0.201 mole) of N-(2-aminoethyl)-N-methyl-3-(p - chlorophenyl) - propylamine and 27.8 g. (0.100 mole) of S-methylthiocarbamidesulfate are dissolved in 250 ml. of water, and the mixture is heated with boiling for 5 hours. On cooling, the reaction product will crystallize. After recrystallization of the latter, there will be obtained 52 g. of bis-[N-(2-guanidinoethyl)-N-methyl-3-(p-chloro-phenyl)-propylamine]-sulfate having the melting point 161–163° C.

*Example 8.—N-(2-guanidinoethyl)-N-methyl-3-(2-bromophenyl)-propylamine*

(A) *N-cyanomethyl-N-methyl-3-(2-bromophenyl)-propylamine.*—14 g. (0.0614 mole) of N-methyl-3-(2-bromophenyl)-propylamine, dissolved in 50 ml. of absolute ethyl alcohol, are added to 3.3 g. (0.0307 mole) of sodium carbonate and 4.64 g. (0.0614 mole) of chloroacetonitrile in 150 ml. of absolute ethyl alcohol. The mixture is refluxed with agitation for 17 hours. After cooling, the sodium chloride is filtered off, and the ethyl alcohol is driven off. The residue is dissolved in diethylether and washed with water. The ether phase is dried, and the solvent is then driven off. The product is distilled collecting a fraction having the B.P. 148–152° C. at 0.5 mm. of Hg, $n_D^{20°}=1.5439$. The yield of N-cyanomethyl-N-methyl - 3 - (2 - bromophenyl)-propylamine is 13.5 g. (82.5%).

(B) *N - (2 - aminoethyl) - N - methyl - 3 - (2 - bromophenyl)-propylamine.*—13.5 g. (0.0505 mole) of N-cyanomethyl-N-methyl-3-(2-bromophenyl)propylamine, dissolved in 50 ml. of dried ether, are added, dropwise, to 2.48 g. (0.065 mole) of lithiumaluminiumhydride, dispersed in 200 ml. of dry ether. The mixture is refluxed with agitation for 18 hours. After hydrolyzing, the aluminate is filtered off and washed four times with ether. The ether extracts are dried and evaporated. The residue is distilled under vacuum while collecting a fraction having the B.P. 125–130° C. at 0.3 mm. of Hg, $n_D^{20°}=1.5451$. The yield of N-(2-aminoethyl)-N-methyl-3-(2-bromophenyl)-propylamine is 11.5 g. (84%).

(C) *N - (2 - guanidinoethyl) - N - methyl - 3 - (2 - bromophenyl)-propylamine.*—11.5 g. (0.0425 mole) of N-(2-aminoethyl)-N-methyl-3-(2-bromophenyl) - propylamine and 5.9 g. (0.0212 mole) of S-methylisothiocarbamidesulfate, dissolved in 50 ml. of water, are refluxed for 6 hours. On cooling, the reaction product will crystallize. The crystallizate is first recrystallized from water and then from a mixture of methanol and acetone. The yield of bis - [N - (2 - guanidinoethyl) - N - methyl - 3 (2 - bromophenyl)-propylamine]-sulfate having the melting point 162–164° C. is 10.2 g.

*Analysis.*—Calc. C, 43.10; H, 6.12; N, 15.47; S, 4.42; Br, 22.06. Found: C, 43.16; H, 6.15; N, 15.46; S, 4.78; Br, 21.81.

*Example 9.—N-(2-guanidinoethyl)-N-methyl-3-(2-chlorophenyl)-propylamine*

(A) *N - cyanomethyl - N - methyl - 3 - (2 - chlorophenyl)-propylamine.*—42.3 g. (0.232 mole) of N-methyl-3-

(2-chlorophenyl)-propylamine, dissolved in 50 ml. of absolute ethyl alcohol, are added in a dropwise manner to 17.5 g. (0.232 mole) of chloroacetonitrile and 12.3 g. (0.116 mole) of sodium carbonate in 450 ml. of absolute ethyl alcohol. The mixture is refluxed for 8 hours with agitation. After cooling, the sodium chloride is filtered off and the ethyl alcohol is driven off. The residue is dissolved in diethyl ether and rinsed with water. The ether phase is dried, and the ether is driven off. The residue is distilled under vacuum while collecting a fraction having the B.P. 172–176° C. at 10 mm. of Hg, $n_D^{20°}=1.5269$. The yield of N-cyanomethyl-N-methyl-3-(2-chlorophenyl)-propylamine is 42 g. (82%).

(B) *N - (2 - aminoethyl) - N - methyl - 3 - (2 - chlorophenyl)-propylamine.*—42 g. (0.189 mole) of N-cyanomethyl - N - methy-3-(2-chlorophenyl)-propylamine dissolved in 100 ml. of dried diethylether, are added, in a dropwise manner, to 9.5 g. (0.25 mole) of lithiumaluminiumhydride dispersed in 700 ml. of dried ethylether. The mixture is refluxed for 8 hours. After hydrolyzing, the aluminate formed is filtered off and rinsed four times with diethylether. The ether phases are combined and dried. The ether is driven off and the residue is distilled in vacuum while collecting a fraction having the B.P. 153–157° C. at 10 mm. of Hg, $n_D^{20°}=1.5292$. The yield of N - (2-aminoethyl)-N-methyl-3-(2-chlorophenyl)-propylamine is 35.5 g. (84%).

(C) *N - (2 - guanidinoethyl) - N - methyl - 3 - (2-chlorophenyl)-propylamine.*—17.9 g. (0.0792 mole) of N-(2 - aminoethyl) - N - methyl - 3 - (2 - chlorophenyl) - propylamine and 11 g. (0.0396 mole) of S-methyl-isothiocarbamidesulfate are dissolved in 50 ml. of water, and the solution is refluxed for 7 hours. On cooling, the product will crystallize. The crystallizate is first recrystallized from water and then from a mixture of methanol and acetone. The yield of bis-[N-(2-guanidinoethyl)-N-methyl-3-(2-chlorophenyl)-propylamine]-sulfate having the melting point 176.5–178° C. is 11.1 g.

*Analysis.*—Calc.: C, 49.12; H, 6.98; N, 17.04; S, 5.04; Cl, 11.16. Found: C, 49.11; H, 6.87; N, 17.58; S, 5.22; Cl, 11.20.

What is claimed is:
1. A member of the group consisting of (1) compounds of the formula:

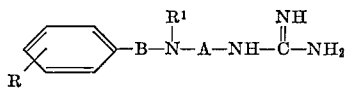

in which R represents a member selected from the group consisting of hydrogen, chloro, bromo, and lower alkoxy, $R^1$ is a lower alkyl, containing from 1 to 4, inclusive, carbon atoms, B is a lower alkylene, containing from 2 to 5, inclusive, carbon atoms, and A is a lower alkylene, containing from 1 to 5, inclusive, carbon atoms, and (2) therapeutically useful acid-addition salts of said compounds.

2. N - (2 - guanidinoethyl) - N - methyl - 3 - phenylpropylamine.
3. Therapeutically useful acid-addition salts of the compound set forth in claim 2.
4. N - (2 - guanidinoethyl) - N - methyl - 2 - phenyl - 1 - methylethylamine.
5. Therapeutically useful acid-addition salts of the compound set forth in claim 4.
6. N - (2 - guanidinoethyl) - N - methyl - 2 -phenylethylamine.
7. Therapeutically useful acid-addition salts of the compound set forth in claim 6.
8. N - (2 - guanidinoethyl) - N - ethyl - 3 - phenylpropylamine.
9. Therapeutically useful acid-addition salts of the compound set forth in claim 8.
10. N - (3 - guanidinopropyl) - N - methyl - 3 - phenylpropylamine.
11. Therapeutically useful acid-addition salts of the compound set forth in claim 10.
12. N - (2 - guanidinoethyl) - N - methyl - 3 - (p - methoxyphenyl)-propylamine.
13. Therapeutically useful acid-addition salts of the compound set forth in claim 12.
14. N - (2 - guanidinoethyl) - N - methyl - 3 - (p - chlorophenyl)-propylamine.
15. Therapeutically useful acid-addition salts of the compound set forth in claim 14.
16. N - (2 - guanidinoethyl) - N - methyl - 3 - (o - chlorophenyl)-propylamine.
17. Therapeutically useful acid-addition salts of the compound set forth in claim 16.
18. N - (2 - guanidinoethyl) - N - methyl - 3 - (o - bromophenyl)-propylamine.
19. Therapeutically useful acid-addition salts of the compound set forth in claim 18.

References Cited by the Examiner

UNITED STATES PATENTS

| | | | |
|---|---|---|---|
| 2,672,029 | 6/28 | Heyn | 260—564 |
| 2,851,457 | 9/58 | Zimmermann | 260—243 |
| 2,881,175 | 4/59 | Wright | 260—294.7 |
| 2,903,453 | 9/59 | Biel | 260—247.2 |
| 2,928,829 | 3/60 | Mull | 260—239 |
| 2,951,078 | 8/60 | Biel | 260—247.5 |
| 3,006,913 | 10/61 | Mull | 260—239 |
| 3,027,370 | 3/62 | Bindler | 260—564 X |

CHARLES B. PARKER, *Primary Examiner.*